Aug. 6, 1946.   A. C. ENGELHEART   2,405,348
AUTOMOBILE SUNSHADE
Filed April 5, 1945   2 Sheets-Sheet 2

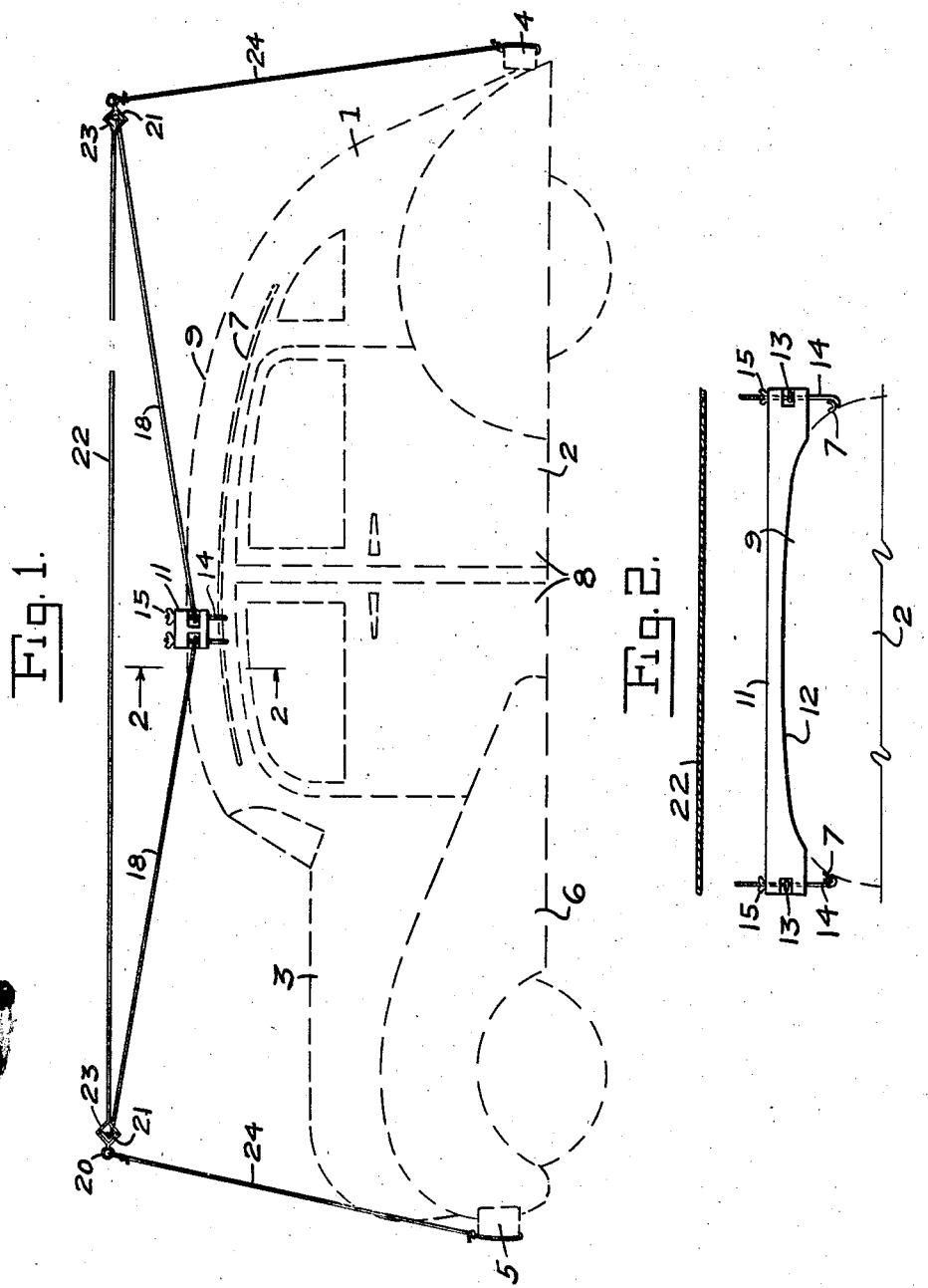

INVENTOR.
Alexis C. Engelheart
BY Victor J. Evans & Co.
ATTORNEYS

Patented Aug. 6, 1946

2,405,348

UNITED STATES PATENT OFFICE 2,405,348

AUTOMOBILE SUNSHADE

Alexis C. Engelheart, Houston, Tex.

Application April 5, 1945, Serial No. 586,737

1 Claim. (Cl. 296—137)

My present invention, in its broad aspect, has reference to improvements in sun shades for motor vehicles, or canopies which may be quickly put up and taken down to shield the vehicle from contact with sun and the like, and more particularly, it is my purpose to provide a device of this character which may be quickly applied to a conventional automobile, or removed, and which will form a shield or shade over the whole car including the body and hood. There are many occasions, even with a closed car, when it is desirable to shield the same from direct contact by the sun's rays and the like, and my device provides a simple, sturdy, practical and efficient device for this purpose which may be rolled up or compacted and stored in the car for use when the occasion arises and which may be manufactured and sold at relatively small cost.

Other and equally important objects and advantages of my invention will be apparent from the following description and drawings, but it is pointed out that changes in form, size, shape, materials and construction and arrangement of parts are permissible and are within the purview of my broad inventive concept, and the scope of the appended claim.

In the drawings, wherein I have illustrated a preferred form of my invention:

Figure 1 is a side view, with the automobile shown in dotted lines;

Figure 2 is a section on the line 2—2 of Figure 1;

In the drawings wherein like characters of reference are used to designate like or similar parts throughout the several views:

Figure 3:
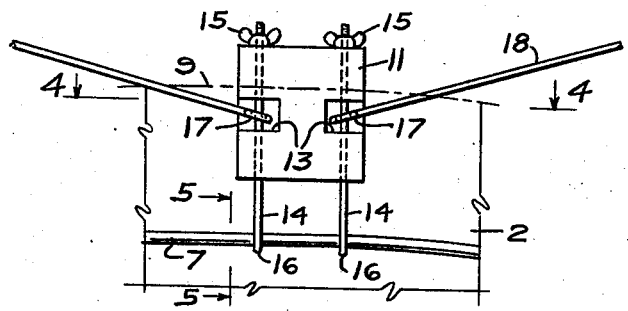
Figure 3 is a detail and end view of the center supporting bar for the frame carried by the top of an automobile.
Figure 4:
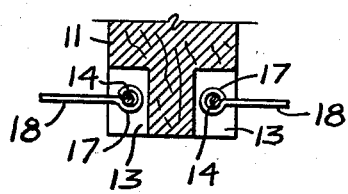
Figure 4 is a section on the line 4—4 of Figure 3.
Figure 5:
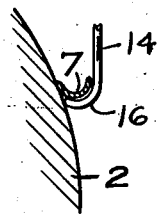
Figure 5 is a section on the line 5—5 of Figure 3.

The numeral 1 designates a closed automobile which is shown in full in Figures 1 and 7 in dotted lines, and which has a body 2, a hood 3, a rear fender 4, a front fender 5, mud guards 6 and drainage gutters 7 over the doors and windows, which are designated 8; the top of the body is designated 9. The showing is for purposes of illustration, and the automobile may be of any make or kind.

Figure 6:
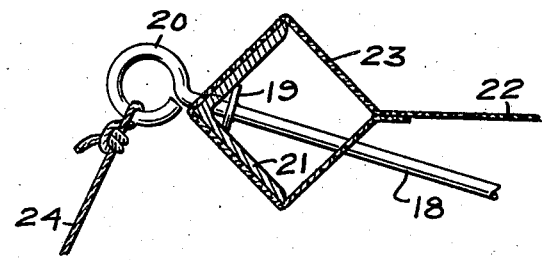
Figure 6 is a sectional detail through one of the end bars and shows the end of one of the rods used in supporting the end bars from the center bar, and the cord attachment thereto.

Mounted transversely across the top of the automobile is a central supporting bar 11 which may be formed of wood or the like, and the under side of which is contoured as at 12 to fit the top on which it is mounted. The ends of the bar 11, between its top and bottom, are formed with side slots 13, and a pair of vertical bores extending through the ends from top to bottom are provided to receive bolts 14. Each bolt 14 has a threaded end to receive a wing nut 15 and a hook 16 is formed on the opposite end to engage under the gutters 7 to hold the bar in place. The bolts extend through side slots 13 and are engaged by the eyes 17 of angularly upwardly and outwardly front and back rods 18. Each rod 18 has a collar 19 and an eye 20 on its opposite end between which are engaged the angled end bars 21. The elongated rectangular cover 22 is formed with a wide hem 23 at each end through which the end bars are mounted as shown in Figure 6. The end bars 21 and the cover 22 are supported by the rods 18 in the position shown in Figure 1. At the corners, and connected to eyes 20 are ropes or cables 24 which are secured about front and rear bumpers 4 and 5 to hold the cover or canopy in place and taut. In holding the cover, the rods 18 have a lengthwise tensioning effect on the cover. It will, therefore, be seen that a simple, sturdy and practical cover is provided which is readily put up and taken down, and can be stored in a small space when not in use.

From the foregoing, it is believed that the objects and advantages of my invention will be apparent, but it is again emphasized that interpretation of the scope of my invention should only be conclusive when made in the light of the subjoined claim.

I claim:

A cover for vehicles, comprising a sheet of material, broad hemmed ends on said sheet, a bar angular in cross section, extending through the hemmed ends of the sheet, a center bar extending across and supported by and contoured on the undersurface thereof to fit the top of the vehicle, rods having eyes at both ends thereof, the eyes on one end of the rods engaging the ends of the end bars at an angle thereto, hook bolts mounted in the ends of said center bar, the hooks engaged under the gutters of the top of the vehicle, the eyes at the opposite ends of the rods attached to the hook bolts in the center bar to mount the end bars and the cover sheet over the top of the vehicle, slots in the ends of said bar to seat the eyes of said rods at their connection with said hook bolts and cables connected with the vehicle at the front and back and connected with the rods at the eyes of the end bars.

ALEXIS C. ENGELHEART.